United States Patent Office 3,550,030
Patented Dec. 22, 1970

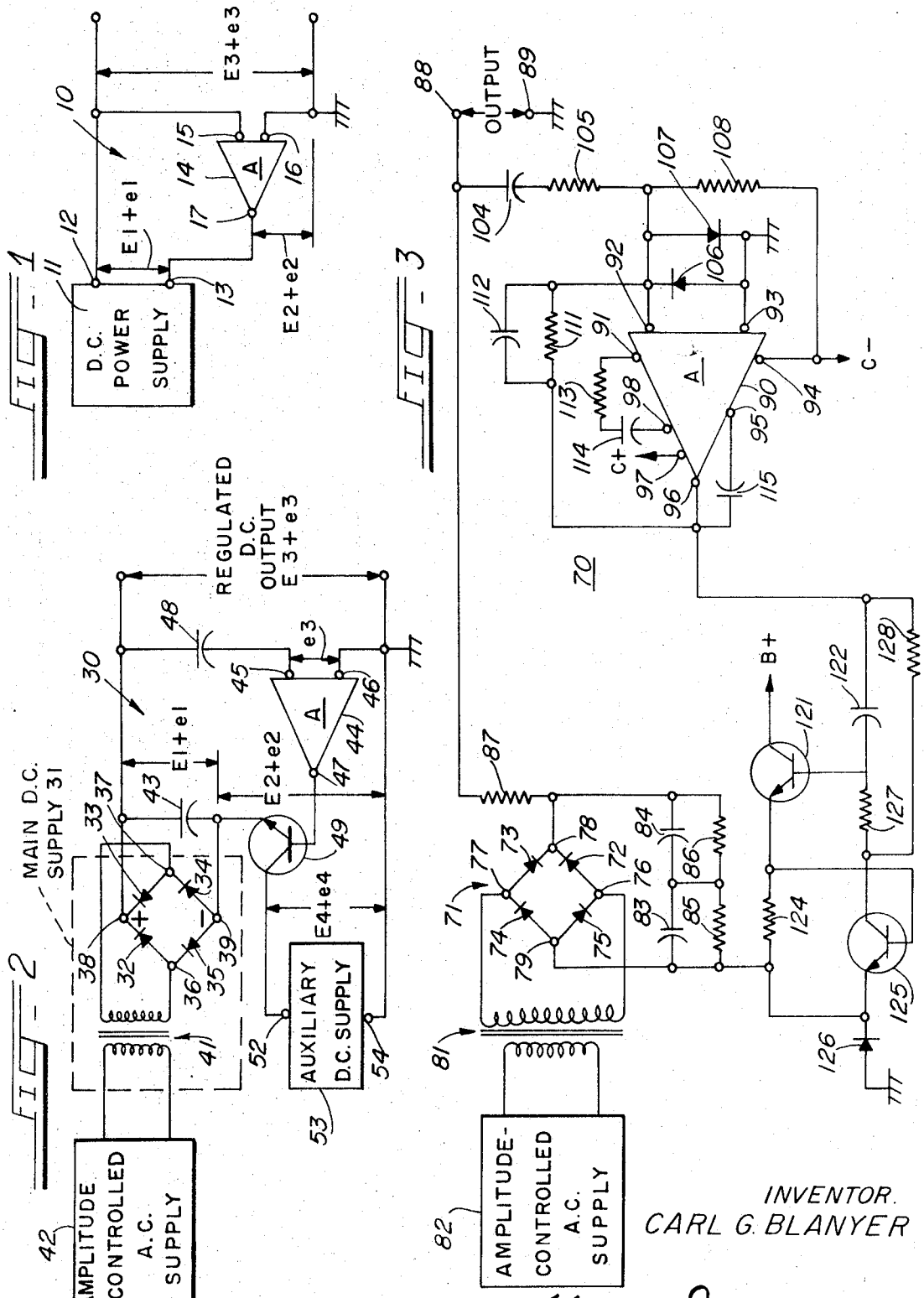

3,550,030
TRANSIENT REGULATION OF DIRECT CURRENT ELECTRICAL POWER SUPPLIES
Carl G. Blanyer, West Covina, Calif., assignor to Abex Corporation, New York, N.Y., a corporation of Delaware
Filed Nov. 29, 1968, Ser. No. 779,746
Int. Cl. H03f 1/00
U.S. Cl. 330—199        4 Claims

ABSTRACT OF THE DISCLOSURE

A transient and ripple suppression circuit for a DC power supply comprising an AC amplifier, having a gain −K, connected in a feedback circuit from one terminal of the DC supply to the other with the second input to the amplifier connected to a plane of reference potential, the output being taken between the first terminal of the power supply and the reference plane and affording a DC voltage in which transient or ripple fluctuations are reduced by a factor of approximately 1+K.

BACKGROUND OF THE INVENTION

A common requirement in electronic equipment is a direct current power supply capable of delivering a constant output voltage under changing input and load conditions. Such regulated DC supplies, as required in many applications, must afford a constant output voltage or current, or both, despite fluctuations in the AC line voltage input or other input to the power supply. In many instances, the power supply must be capable of compensating for variations in the load requirements of the electronic apparatus in which it is employed, maintaining a steady, precisely controlled voltage. But conventional regulated DC supplies frequently present undesired regularly recurring fluctuation components in their outputs, commonly designated as "ripple." Thus, in those applications in which the DC supply is energized from a conventional sixty cycle AC source, at least some sixty cycle ripple is apparent in the output from the supply circuit.

A variety of different circuits have been devised for use as regulated power supplies. In many of these, ripple fluctuations and brief non-recurring transient fluctuations are not adequately minimized. In others, the circuit components required for ripple and transient reduction are excessive in cost, size, or complexity. The energy storage capacity required for effective regulation may present a safety hazard and may require the use of relatively high-cost components.

SUMMARY OF THE INVENTION

It is a principal object of the invention, therefore, to provide a new and improved circuit for the suppression of transient and ripple fluctuations in a unipotential power supply.

A further object of the invention is to provide a new and improved transient and ripple suppression circuit for a direct current power supply that permits effective use of inexpensive line frequency rectification and average-value regulation systems, yet eliminates transient and ripple fluctuations without the excessive size, cost, or complexity of previously known circuits.

Another object of the invention is to reduce the energy storage requirements for effective voltage regulation in a direct current power supply while at the same time assuring effective suppression of transient and ripple fluctuations.

A specific object of the invention is to provide a new and improved transient and ripple suppression circuit for a unipotential power supply in which the principal control element is operated at voltages substantially lower than the power supply voltage, thereby reducing the cost, size, and power requirements of the circuit components.

A transient and ripple suppression circuit for a unipotential power supply having first and second output terminals, constructed in accordance with the invention, comprises an AC-coupled amplifier having first and second input terminals and an output terminal and having a gain factor of −K. The first input terminal of the amplifier is connected to the first output terminal of the power supply and the second input terminal of the amplifier is connected to a plane of reference potential; means are provided for coupling the output terminal of the amplifier to the second output terminal of the power supply. The output of this circuit, taken between the first output terminal of the power supply and the plane of reference potential, affords a voltage in which transient and ripple fluctuations are reduced by a factor of 1+K relative to the corresponding fluctuations in the output of the power supply itself.

BRIEF DESCRIPTION OF THE DRAWING

FIG. 1 is a simplified circuit diagram of the basic circuit of the invention;

FIG. 2 is a schematic circuit diagram of a circuit constructed in accordance with another embodiment of the invention; and FIG. 3 is a detailed circuit diagram of a specific power supply circuit for a particular application.

DESCRIPTION OF THE PREFERRED EMBODIMENTS

FIG. 1 illustrates at transient and ripple suppression circuit 10 utilized with a unipotential power supply 11 having first and second output terminals 12 and 13. The polarities for terminals 12 and 13 of the DC power supply 11 are not critical with respect to the invention and hence have not been indicated in the drawing. Power supply 11 may constitute a conventional DC power supply having sufficient regulation so that it is capable of delivering appropriate average voltages and currents for the operation of a particular electronic apparatus. However, the power supply is non-ideal in that the output voltage across terminals 12 and 13 may include undesirable large ripple components or may exhibit undesirable transient fluctuations under the influence of external disturbances.

The transient and ripple suppression circuit 10 comprises an AC coupled amplifier 14 having a first input terminal 15, a second input terminal 16, and an output terminal 17. The first input terminal 15 of amplifier 14 is connected to the first output terminal 12 of power supply 11. The second input terminal 16 to the amplifier is connected to a plane of reference potential, shown in FIG. 1 as system ground. The output terminal of amplifier 14 is connected back to the second output terminal 13 of power supply 11. The output of the composite circuit is taken between the first output terminal 12 of the power supply and the plane of reference potential, system ground, that is connected to the second input terminal of amplifier 14.

Amplifier 14 may constitute any effective AC amplifier, preferably a relatively high-gain amplifier. The gain factor of the amplifier is taken as −K for alternating or fluctuating signals only. For steady state DC signals, the amplifier gain is effectively zero.

As shown in FIG. 1, the voltage across the output terminals 12 and 13 of power supply 11 includes an average or steady state component E1. The fluctuating component of the voltage across terminals 12 and 13 is represented as e1, so that the total output voltage from DC power supply 11, taken across terminals 12 and 13, is $E1+e1$.

The output voltage of amplifier 14 may comprise a steady state or average component E2 and a fluctuating ripple or transient component e2 so that this voltage, as indicated in FIG. 1, is $E2+e2$. Similarly, the composite output voltage of the circuit, taken between power supply terminal 12 and system ground, is $E3+e3$ and includes both a steady state component and a fluctuating component.

From FIG. 1, it is apparent that the output voltage from the transient and ripple suppression circuit 10 is the sum of the separate voltages constituting the outputs of power supply 11 and amplifier 14. Thus, (1) $\qquad E3+e3=E1+E2+e1+e2$ Moreover, the steady state output voltage is the sum of the steady state outputs of the power supply and the amplifier; that is:

(2) $\qquad E3=E1+E2$ and the transient or fluctuating voltages bear the same relationship, (3) $\qquad e3=e1+e2$ Because amplifier 14 is an alternating current amplifier, the average value E2 of its output voltage is independent of the input to the amplifier. But the fluctuating component of the amplifier output is a function of its input and the amplifier gain; that is, (4) $\qquad e2=-K(e3)$ Combining Equations 3 and 4, it is seen that (5) $\qquad e3=e1-K(e3)$ so that (6) $\qquad e3=\dfrac{e1}{1+K}$ From the foregoing analysis it is seen that the fluctuating voltage components in the output of circuit 10 are reduced by a factor of $1+K$ relative to the corresponding fluctuations in the output voltage of power supply 11. This reduction in the transient and ripple components of the output voltage is independent of the source of the fluctuations in the output of power supply 11. That is, the fluctuation component e3 in the output of circuit 10 is reduced by the factor of $1+K$ relative to the initial fluctuation component e1 regardless of whether the fluctuations constitute a regularly recurring ripple voltage or are the result of transient disturbances. Circuit 10 thus functions both as a ripple reducer and as a transient suppressor. Moreover, circuit 10 causes the power supply to present a low output impedance but a high transfer impedance from the main power input to supply 11 to the output to the electronic apparatus in which the circuit is employed.

FIG. 2 illustrates a transient and ripple suppression circuit 30 constituting a somewhat more sophisticated version of the invention. In FIG. 2, the main DC power supply 31 comprises a diode bridge including four diodes 32, 33, 34 and 35 and having input terminals 36 and 37 and output terminals 38 and 39. The input terminals 36 and 37 of the rectifier bridge are connected to the opposite ends of the secondary winding of an input transformer 41. The primary winding of transformer 41 is connected to a conventional AC supply 42. A filter capacitor 43 is connected across output terminals 38 and 39 of power supply 31.

The transient and ripple suppression circuit 30 of FIG. 2 comprises an amplifier 44 having first and second input terminals 45 and 46 and an output terminal 47. The first input terminal 45 of amplifier 44 is coupled to the first output terminal 38 of power supply 31 by means of a coupling capacitor 48. Capacitor 48 has been shown separately from amplifier 44 in FIG. 2 merely to illustrate one explicit means by which the amplifier can be made to respond only to the fluctuating part of the output voltage from power supply 31. The capacitor may be considered as constituting an integral part of amplifier 44.

The second input terminal 46 of amplifier 44 is again connected to a plane of reference potential, shown in FIG. 2 as system ground.

The output terminal 47 of amplifier 44 is connected to the base electrode of a transistor 49 incorporated in circuit 30 as a principal control element. Transistor 49 may constitute an integral part of amplifier 44 but has been shown separately for purposes of clarity in explanation of the circuit operation. The emitter of transistor 49 is connected to the second output terminal 39 of DC power supply 31 to afford the requisite connection between amplifier 44 and the power supply. The collector electrode of transistor 49 is connected to one terminal 52 of an auxiliary DC supply 53, the other terminal 54 of the auxiliary supply being returned to the reference plane, system ground.

In operation of the ripple and transient suppression circuit 30 of FIG. 2, the alternating voltage from AC supply 42 is supplied, through transformer 41, to the rectifier bridge comprising diodes 32–35. The output voltage from the bridge, across terminals 38 and 39, is partly smoothed by filter capactior 43. Nevertheless, this voltage still includes ripple and other transient comopnents e1 in addition to the steady state component E1. It should be noted that the main DC power supply 31 is not itself connected to the reference plane, system ground.

The alternating or other fluctuating components in the output voltage from the main DC power supply 31 are, as before, supplied to the AC amplifier 44. The output signal from the amplifier drives the base of the control elements, transistor 49. Amplifier 44 must be capable of holding the emitter of transistor 49, by way of its connection to the transistor base, at a potential adequate to maintain an appropriate operating voltage across the transistor. Moreover, the voltage from the auxiliary DC supply 53 must be sufficiently large to permit amplifier 44 to adjust the emitter voltage of transistor 49 in an amount equal to or larger than the largest fluctuation anticipated across capacitor 43. Transistor 49 may be considered to constitute the final stage of amplifier 44; it operates much like an emitter follower. The auxiliary DC supply need not be energized separately from the remainder of the circuit; thus, the auxiliary DC supply may be energized from the AC supply 42.

In steady state operation, in the absence of transients, the fluctuating portion e2 of the emitter voltage of control transistor 49 is similar in form to the ripple voltage appearing across capacitor 43, but is instantaneously opposite in polarity. If the gain of amplifier 44 is relatively high, the ripple fluctuations that appear across capacitor 43 are effectively suppressed and produce a negligible effect in the regulatde DC output. This is also true of any transient voltages appearing across capacitor 43. Furthermore, it can be demonstrated that fluctuations in the output voltage of auxiliary DC supply 53, as well as any other disturbances that might tend to cause fluctuations in the emitter voltage of control transistor 49, are effectively suppressed.

In typical applications the AC supply 42 may be controlled by conventional average-value regulation means (not shown) to cause the average value of the output from the circuit 30 to be correct. The main regulating means applied to AC supply 42 need not be capable of rapid response. Even with slow-response regulation, both the average and instantaneous values of the output voltage are effectively regulated and ripple and transient fluctuations are minimized.

A number of benefits are derived from the circuit of FIG. 2 that cannot be achieved by more conventional techniques. For example, as noted above, the means employed to control the average or steady state value of the output voltage need not afford a rapid response to transient, ripple, or other fluctuations. Specifically, conventional line frequency rectification and average-value regulation circuits can be conveniently employed.

Making use of the step-up or step-down properties of transformer 41, the means employed to control the average value of the output voltage need not operate at the voltage levels, or the current levels, required for the apparatus energized by the DC power supply 31. Instead, the average value control means can be arranged to operate at the most convenient combination of voltage and current. The elements employed for basic ripple reduction, typically capacitor 43 or other elements, may be reduced in effectiveness and hence in size, cost, and complexity from those which would be required without the aid of the transient-suppression circuit 30. The reduction in the required effectiveness for the basic filtering element or elements reduces the energy storage demands on those elements and thus improves the safety of the composite circuit.

The control transistor 49 employed in the transient suppression circuit 30 must necessarily pass the maximum current required of the main DC supply 31. However, the control transistor can be operated at much lower voltages than those required of the main DC supply. Thus, low voltage elements can be employed for ripple and transient reduction in high voltage supplies. Furthermore, control transistor 49 may operate at relatively low power levels in comparison with the power delivered by the composite supply circuit because the voltage levels may be much smaller than the average output voltage of the regulated DC supply.

It should be understood that the present invention is not limited to semiconductor applications. The principal control element in circuit 30, transistor 49, has been selected and illustrated only as a typical example. The basic transient and ripple suppression circuit can be employed in applications where vacuum tubes, magnetic amplifiers, and other devices are utilized for either amplifier 44 or control element 49, or both.

FIG. 3 illustrates yet another embodiment of the invention constituting a transient and ripple suppression circuit 70 utilized as a power supply for a klystron. The fluctuation-suppression circuit 70 is employed in conjunction with a relatively conventional main DC power supply 71 comprising a diode bridge including four diodes 72, 73, 74 and 75 having input terminals 76 and 77 and output terminals 78 and 79. The diode bridge is energized from the secondary winding of a transformer 81 having a primary winding connected to an amplitude-controlled AC supply circuit 82.

A filter circuit is connected across the output terminals 78 and 79 of the main power supply 71. This filter circuit comprises two series-connected capacitors 83 and 84; two resistors 85 and 86 are connected in parallel with capacitors 83 and 84, respectively. The first output terminal 78 of the rectifier bridge is connected through a surge-limiting resistor 87 to a circuit output terminal 88. The output from the circuit, constituting the beam output for the klystron, is taken between terminal 88 and a second output terminal 89 that is connected to a plane of reference potential shown as system ground.

The transient and ripple suppression circuit 70 of FIG. 3 comprises an operational amplifier 90 that may be of conventional construction and is shown as having eight terminals 91 through 98. Terminals 92 and 93 constitute the input terminals for the operational amplifier, in the illustrated circuit, and terminal 96 is the output terminal for the amplifier. A parallel RC circuit comprising a resistor 111 and a capacitor 112 is connected between amplifier terminals 96 and 92. A series RC circuit comprising a resistor 113 and a capacitor 114 interconnects terminals 98 and 91 of the amplifier. Terminal 97 is connected to an auxiliary low voltage DC supply designated as C+. A capacitor 115 is coupled between terminals 95 and 96 of the amplifier. Terminal 94 is connected to a negative low voltage auxiliary supply designated as C−.

The first input terminal 92 of operational amplifier 90 is connected to the output terminal 88 by a series circuit comprising a blocking capacitor 104 and a surge current limiting resistor 105. Resistor 105 also constitutes a part of the gain-determining feedback network for amplifier 90. The first input terminal 92 of amplifier 90 is also returned to the auxiliary negative low voltage supply C− through a bias resistor 108. A pair of clamping diodes 106 and 107 are connected in opposed polarization between the input terminals 92 and 93 of the operational amplifier. The second input terminal 93 of the amplifier is connected to a plane of reference potential, illustrated in FIG. 3 as system ground.

Suppression circuit 70 further includes a control element, comprising a transistor 121, incorporated in a circuit coupling amplifier 90 back to the main DC power supply 71. The base electrode of transistor 121 is coupled to the output terminal 96 of amplifier 90, for high-frequencies, by a capacitor 122. The collector electrode of control transistor 121 is connected to a relatively high voltage auxiliary supply designated as B+.

Control element 121 is connected to the main DC power supply 71 by a current-limiting resistor 124 that connects the emitter of transistor 121 to the negative terminal 79 of the rectifier bridge. Resistor 124 is a part of a fault-current limiting circuit that also includes a transistor 125. The base of transistor 125 is connected to the emitter of transistor 121. The emitter of transistor 125 is connected to terminal 79 and is returned to ground through a blocking diode 126. The collector of transistor 125 is connected to a resistor 127 that is in turn connected to the base of transistor 121. The collector of transistor 125 is also connected through a resistor 128 to the output terminal 96 of operational amplifier 90; resistors 127 and 128 afford the principal coupling circuit between amplifier 90 and transistor 121.

The operation of the transient and ripple suppression circuit 70 of FIG. 3 is essentially similar to the operation of the previously described embodiments, and hence need be given only general consideration. As in the circuit of FIG. 2, the AC supply 82 is provided with conventional regulation means (not shown) effective to maintain the average value of the AC output voltage supplied to power supply 71 at the correct level. The regulating means is not required to be capable of rapid response; short-term fluctuations and ripple variations are effectively minimized by the circuit 70. Basic circuit operation is the same as in FIG. 2; a somewhat more sophisticated arrangement has been illustrated in FIG. 3 for a particular application. With the circuit of FIG. 3, utilizing the components set forth in detail hereinafter, for a full load current of 70 milliamperes DC, and with a ripple voltage across capacitors 83 and 84 of approximately six volts peak-to-peak, the output ripple across terminals 88 and 89 is reduced to substantially less than 50 millivolts peak-to-peak. It should be understood that the specific circuit data set forth hereinafter are provided only by way of illustration and not as a limitation on the invention.

TYPICAL COMPONENTS (FIG. 3)

Resistors:
```
85, 86 _____ 390 kilohms.
87     _____ 400 ohms.
105    _____ 10 kilohms.
108    _____ 8.2 megohms.
111    _____ 3.3 megohms.
113    _____ 1.5 kilohms.
124    _____ 4.7 ohms.
127    _____ 100 ohms.
128    _____ 2.7 kilohms.
```

Capacitors:
```
83, 84    _____ 180 microfarads.
104       _____ 0.1 microfarad.
112, 114  _____ 100 micro-microfarads.
115       _____ 20 micro-microfarads.
122       _____ 0.001 microfarad.
```

COMPONENTS—Continued

Transistors, diodes, amplifier:
- 72, 73, 74, 75 .......... 1N1731.
- 90 ..................... Fairchild 709-type.
- 106, 107 ............... 1N4446.
- 121 .................... 2N3055.
- 126 .................... 1N4998.
- 125 .................... 2N3053.

Voltage supplies:
- Main DC supply 71 ___ 600–800 volts DC.
- B+ .................... +40 volts DC.
- C+ .................... +15 volts DC.
- C− .................... −15 volts DC.

I claim:

1. A transient and ripple suppression circuit for a regulated unipotential power supply having first and second output terminals, comprising:
   a high-gain solid-state operational amplifier having first and second input terminals and an output terminal, and having a gain factor of $-K$;
   said first input terminal of said amplifier being A.C. coupled to said first output terminal of said power supply;
   said second input terminal of said amplifier being connected to a plane of reference potential;
   and D.C. connecting means connecting said output terminal of said amplifier to said second output terminal of said power supply;
   the output of said circuit, taken between said first output terminal of said power supply and said plane of reference potential, having any transient and ripple fluctuations reduced by a factor of approximately $1+K$ relative to the corresponding fluctuations in the output of said power supply.

2. A transient and ripple suppression circuit for a main unipotential power supply, according to claim 1, and further comprising an auxiliary unipotential supply, in which said D.C. connecting means comprises a control device having input, output and control electrodes, said output terminal of said amplifier being coupled to said control electrode, said input electrode being coupled to said auxiliary unipotential supply, and said output electrode being connected to said second output terminal of said main power supply.

3. A transient and ripple suppression circuit according to claim 2 in which said control device is a transistor and said input, output, and control electrodes are the collector, emitter and base electrodes, respectively, of the transistor.

4. A transient and ripple suppression circuit according to any of claims 1 through 3 and further comprising a separate capacitive ripple-suppression circuit connected across said power supply output terminals.

References Cited
UNITED STATES PATENTS

| | | | |
|---|---|---|---|
| 2,630,557 | 3/1953 | Bixby | 321—10X |
| 3,353,080 | 11/1967 | Santelmann | 321—10X |

ROY LAKE, Primary Examiner

J. B. MULLINS, Assistant Examiner

U.S. Cl. X.R.

321—10